United States Patent [19]

Stone

[11] Patent Number: 5,042,447
[45] Date of Patent: Aug. 27, 1991

[54] THERMOSTATICALLY CONTROLLED FUEL HEATER AND COOLER

[75] Inventor: Walter H. Stone, Modesto, Calif.

[73] Assignee: Parker Hannifin Corporation, Cleveland, Ohio

[21] Appl. No.: 595,912

[22] Filed: Oct. 11, 1990

[51] Int. Cl.$^5$ .............................................. F02M 31/00
[52] U.S. Cl. .................................... 123/557; 123/541; 123/552; 123/545
[58] Field of Search ............... 123/557, 541, 552, 545, 123/547

[56] References Cited

U.S. PATENT DOCUMENTS

| | | | |
|---|---|---|---|
| 4,187,813 | 2/1980 | Stumpp | 123/557 |
| 4,434,773 | 3/1984 | Granetzke | 123/557 |
| 4,872,438 | 10/1989 | Ausiello et al. | 123/541 |

Primary Examiner—Andrew M. Dolinar
Assistant Examiner—M. Macy
Attorney, Agent, or Firm—Ralph E. Jocke

[57] ABSTRACT

A device for heating and cooling fuel to maintain the temperature of fuel delivered to an engine within a desired temperature range includes a body (10) having a fuel inlet (12) and a fuel outlet (14). The body includes a middle portion (16) and a first heat exchanger portion (18) in connection with a heat source. The body also includes a second heat exchanger portion (20) in connection with a heat sink. A thermostatic actuator (86) positioned adjacent the outlet of the device, includes a plunger rod (88) that extends responsive to increased temperature of the fuel passing the actuator. A movable member (74) is positioned by the plunger rod to direct fuel to either a first opening (28) from which the fuel passes through the first heat exchanger portion and is heated, or to a second opening (30) from which the fuel passes through the second heat exchanger portion and is cooled. Fuel passing through the device is divided between the first and second heat exchanger portions to maintain the fuel delivered from the device within the desired temperature range.

26 Claims, 2 Drawing Sheets

THERMOSTATICALLY CONTROLLED FUEL HEATER AND COOLER

TECHNICAL FIELD

This invention relates to devices that are used to control the temperature of fuel being supplied to an engine. Specifically, this invention relates to a device for selectively heating or cooling diesel fuel supplied to an electronically controlled fuel injected diesel engine of a vehicle.

BACKGROUND ART

It has been recognized for many years that in cold temperatures heating diesel fuel is sometimes necessary to keep the fuel flowing. This is because diesel fuel tends to become thicker at cooler temperatures which reduces its ability to flow through fuel lines and filters. Many types of fuel heating devices have been devised over the years to heat diesel fuel. Some of these devices are mounted on diesel powered vehicles and are controlled by the operator. The operator's involvement in controlling the device may result in failure to heat the fuel when required or unnecessary heating of the fuel.

In recent years, electronic fuel control systems have been used on engines, including fuel injected diesel engines. For efficient operation, these electronic fuel systems require that the fuel temperature be within specified limits. If the fuel temperater exceeds these limits, the system will not function properly. Also, high fuel temperatures may result in loss of engine power.

Applicant is unaware of any prior devices that both cool and heat the fuel as required to maintain the fuel being supplied to the engine within a desired range. Thus there exists a need for such a device.

DISCLOSURE OF INVENTION

It is an object of the present invention to provide a device that can both heat and cool fuel being delivered to an engine to maintain the fuel within a temperature range.

It is a further object of the present invention to provide a self contained compact device for heating and cooling fuel.

It is a further object of the present invention to provide a fuel heater and cooler that is thermostatically controlled independent of an operator.

Further objects of the present invention will be made apparent in the following Best Modes for Carrying Out Invention and the appended Claims.

The foregoing objects are accomplished by a thermostatically controlled fuel heater and cooler. The device has a body with a fuel inlet and a fuel outlet. The body includes a middle portion and a first heat exchanger portion. The first heat exchanger portion is connected to a coolant circuit associated with the engine. The hot coolant serves as a heat source.

The body also includes a second heat exchanger portion. The second heat exchanger portion is connected to an air conditioning circuit associated with the engine. Refrigerant used in the air conditioning circuit serves as a heat sink for absorbing heat.

The body of the device includes a first chamber adjacent the inlet and a second chamber adjacent the outlet. The first chamber includes a first opening which enables fuel to enter the first heat exchanger portion of the body, as well as a second opening which enables fuel to enter the second heat exchanger portion of the body.

The second chamber includes a first fluid opening for accepting fuel delivered from the first heat exchanger portion and a second fluid opening to accepting fuel from the second heat exchanger portion.

A thermostatic actuator is mounted in the second chamber adjacent the fuel outlet. The thermostatic actuator includes a plunger rod. The plunger rod is movable and extends further in response to increasing temperature.

The plunger rod is operatively connected to a movable cylindrical member. The movable member is housed in the first chamber. The movable member includes a cylindrical wall portion adjacent the walls of the chamber as well as a plurality of fluid orifices therethrough. The body of the device also includes a seat which is adjacent to the movable member when the movable member is in a first position. The seat blocks the orifices in the moveable member when the movable member and seat are adjacent.

When the fuel passing through the device is cold, the plunger rod is fully retracted in the first position and the movable member is positioned adjacent the seat. As a result, flow through the orifices of the movable member is prevented. In the first position the cylindrical wall portion of the movable member overlaps the second opening in the first chamber. This blocks the flow of fuel from the first chamber to the second heat exchanger portion of the body. Also in the first position, the cylindrical wall portion is disposed away from the first fluid opening enabling fluid to flow from the first chamber into the first heat exchanger portion of the body.

Fuel flowing through the first heat exchanger portion absorbs heat from the hot engine coolant flowing therethrough. From the first heat exchanger portion the heated fuel flows back into the second chamber of the body. The fuel then flows past the thermostatic actuator and out of the body through the outlet.

When the fuel becomes sufficiently warm to be within the desired range, the thermostatic actuator extends the plunger rod. In response to the extension of the plunger rod the movable member moves off its seat. This enables fuel to flow through the orifices in the movable member. As the movable member moves away from the seat, the cylindrical wall portion thereof also moves to provide access to the second opening in the first chamber. This enables some fuel to enter the second heat exchanger portion wherein it is cooled by the refrigerant passing therethrough.

Also, as the movable member moves from the first position, the first opening through which fuel flows to the first heat exchanger portion, is partially blocked by the cylindrical wall of the movable member. As a result, a portion of the fuel is heated while the remainder is cooled. The division of fuel between the first and second heat exchanger portions depends on the position of the movable member, which moves in response to the temperature sensed by the thermostatic actuator.

If the fuel temperature sensed at the actuator goes above the desired range, the thermostatic actuator fully extends the plunger rod. The plunger rod moves the movable member to a second position in which the first opening is completely blocked by the wall of the movable member, and the second opening is fully open. As a result, all of the fuel passing through the device is cooled in the second heat exchanger portion.

BEST MODES FOR CARRYING OUT INVENTION

Figure 1:
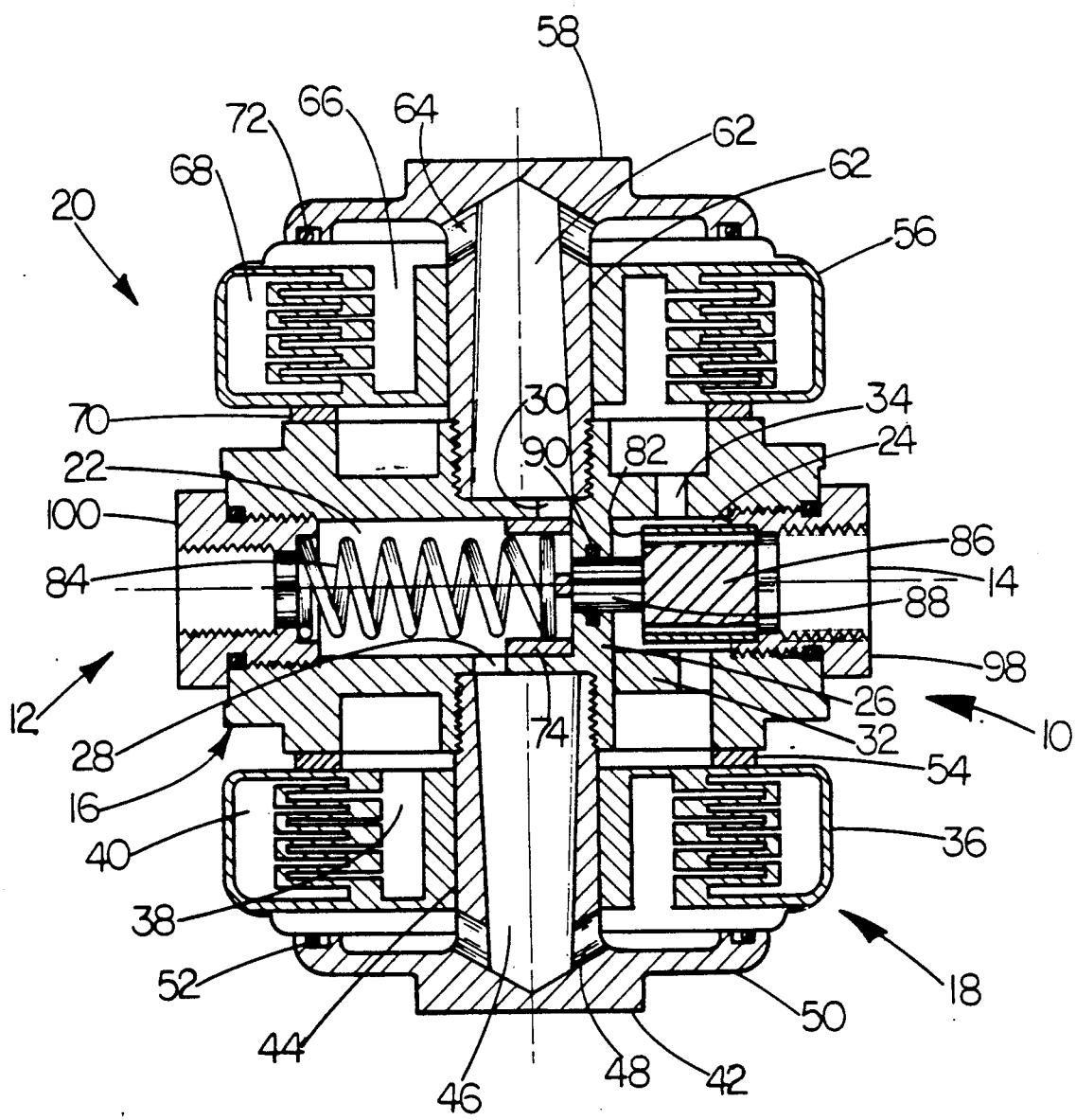
FIG. 1 is a schematic cross sectional view of the thermostatically controlled fuel heater and cooler of the present invention.

Referring now to the drawings and particularly to FIG. 1 there is shown therein the preferred form of the thermostatically controlled fuel heater and cooler of the present invention. The device has a body 10. The body includes a fuel inlet 12 and a fuel outlet 14. The body also includes a middle body portion 16. The body of the device also has a first heat exchanger portion 18 and a second heat exchanger portion 20.

The middle body portion includes therein a first cylindrical chamber 22 and a second chamber 24. The first and second chambers are separated by a dividing wall 26.

The first cylindrical chamber 22 includes a first opening 28 and a second opening 30. Second opening 30 is located in the first chamber adjacent dividing wall 26. First opening 28 provides fluid access to the first heat exchanger portion 18 of the body. Second opening 30 provides fluid access from the first chamber to the second heat exchanger portion 20 of the body.

The second fluid chamber includes a first fluid opening 32 and a second fluid opening 34 which are open to the first and second heat exchanger portions respectively.

The first heat exchanger portion 18 includes a first shell and tube assembly 36. This shell and tube assembly in the preferred form of the invention is a commercially available heat exchanger made by Modine Manufacturing and is sold for use as a water cooled engine oil cooler. This commercially available heat exchanger is used in the preferred form of the device because it provides substantial heat exchange within a compact space. However, in other embodiments of the invention, other heat exchangers may be used.

In the preferred form of the invention, the fuel flows in a tube portion 38 of the shell and tube assembly. Hot coolant supplied from the engine cooling system passes through a shell portion 40 of the shell and tube assembly. As will be understood by those skilled in the art, fittings are used to conduct the coolant into and out of the shell portion of the shell and tube assembly. For purposes of clarity and understanding, however, the fittings necessary to introduce and remove the hot coolant from the shell portion have not been shown in FIG. 1.

First heat exchanger portion 18 also includes a first end cap 42. End cap 42 includes a first central portion 44 which has threads at its upper end which are accepted by mating threads on middle body portion 16. Central portion 44 of end cap 42 has a first fluid conduit 46 extending through its center. First fluid conduit 46 is in fluid communication with first opening 28 in the first chamber. At its lower end, first fluid conduit 46 opens laterally to a pair of first ports 48 which are in fluid communication with the tube portion 38 of the shell and tube assembly.

First end cap 42 includes an extending flange portion 50 which serves to hold shell and tube assembly 36 adjacent to middle body portion 16. A first o-ring seal 52 and a first gasket 54 are positioned at the bottom and top sides respectively, of the first shell and tube assembly 36 to insure that the assembly, cap and middle body portion are held in fluid tight relation.

Second heat exchanger portion 20 of the body 10 is constructed in a manner similar to first heat exchanger portion 18. It includes a second shell and tube assembly 56. A second end cap 58, with a second central threaded portion 60, includes a second fluid conduit 62 therein. Second fluid conduit 62 is in fluid communication with second opening 30 in the first chamber. Second end cap 58 also includes a pair of second ports 64 for passing fluid from the second conduit 62 to a tube portion 66 of the second shell and tube assembly.

A shell portion 68 of shell and tube assembly 56 is supplied with a cool fluid that serves as a heat sink. In the preferred form of the invention a refrigerant that has been expanded through an evaporator is used as the cool fluid. However, chilled water or other cold fluids may be used successfully in other embodiments. As will be apparent to those skilled in the art, fittings are used to conduct the cool fluid into and out of shell portion 68 however these fittings are not shown in FIG. 1 for purposes of simplicity.

As shown in FIG. 1, the tube portion 66 of the second shell and tube assembly 56 is in fluid communication with the second fluid opening 34 in second chamber 24 of the middle portion of the body. A second gasket 70 and a second o-ring seal 72 are positioned adjacent the second shell and tube assembly 56 to hold the second cap 58, second shell and tube assembly and the middle portion of the body in fluid tight relation.

Figure 2:
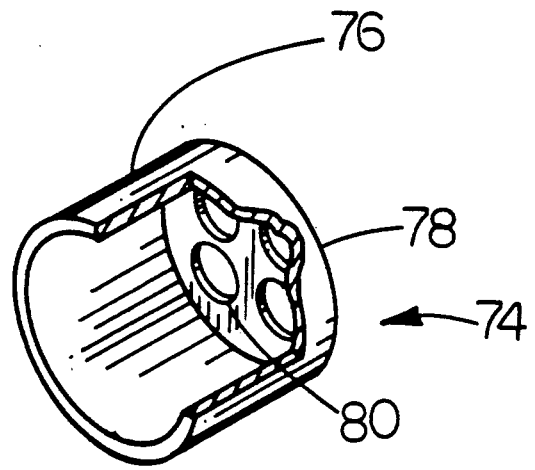
FIG. 2 is a cut away isometric view of the movable member of the fuel heater and cooler shown in FIG. 1.

A movable member 74 is mounted in the first chamber 22 of the middle portion of the body. As shown in FIG. 2, movable member 74 includes a cylindrical wall portion 76 and a back disc 78. Four orifices 80 extend through the back disc 78 of the member.

Adjacent back disc 78 of the movable member is dividing wall 26 a face of which serves as a seat 82. When disc 78 is adjacent seat 82, the orifices 80 through the movable member are blocked so that no fuel may flow therethrough. A spring 84 is mounted in first chamber 22 to bias the movable member 74 towards the seat.

A thermostatic actuator 86 is positioned adjacent the fuel outlet of the device in second chamber 24. Thermostatic actuator 86 includes a plunger rod 88. The plunger rod 88 is journalled in dividing wall 26 and is movable longitudianlly therein. A seal 90 is positioned adjacent the plunger rod in the dividing wall to insure that no fluid may flow directly between the first and second chambers of the middle body portion.

Figure 3:
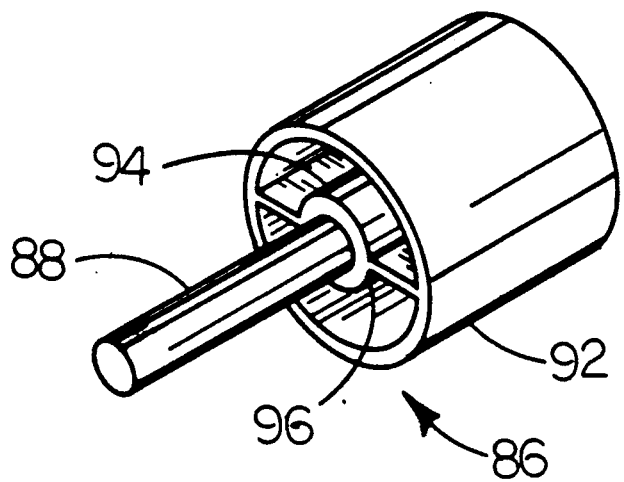
FIG. 3 is an isometric view of the thermostatic actuator of the invention.

As shown in FIG. 3, thermostatic actuator 86 includes an outer cylindrical housing 92. A central core 94 of the actuator contains a thermally expansible material. In the preferred form of the invention, the core is a thermostatic assembly called a "power pill" made by the Robertshaw Controls Company in which an expansible wax material is used. The plunger rod 88 extends from the core and is movable therein. The higher the temperature of the wax in the core, the more it expands and the further the plunger rod extends.

The core is supported in the housing by a pair of vanes 96. This enables fuel to flow between the cylindrical housing 92 and the core 94. This construction insures that the core 94 is exposed to the temperature of the fuel that is passing the actuator.

Thermostatic actuator 86 is nested in a recess in an outlet fitting 98 which is removable from the middle portion of the body. This construction facilitates changing the actuator. Similarly, an inlet fitting 100 bounding the first chamber, accepts an outer portion of spring 84. An inner end of spring 84 is supported on the back disc of movable member 74 and is nested inside the cylindrical wall portion 76 thereof.

In operation of the device, when the fuel is cold, the thermostatic actuator 86 causes plunger rod 88 to be fully retracted and in the first position shown in FIG. 1. As a result, back disc 78 of movable member 74 is positioned adjacent seat 82, and no fuel may flow through the orifices 80 in the first member. In this first position, the cylindrical wall portion 76 of movable member 74 blocks second opening 30. As a result, fuel is prevented from flowing through the second heat exchanger portion wherein it would be cooled.

In the first position of the movable member, fuel entering the inlet of the device passes into the chamber 22, through first opening 28 and into the first heat exchanger portion. Fuel from opening 28 passes downward as shown in FIG. 1, through first conduit 46 in first end cap 42. From first conduit 46 the fuel passes through first ports 48 and into the tube portion 38 of the first shell and tube assembly 36. While passing through the first shell and tube assembly, the fuel absorbs heat from the hot coolant passing through the shell portion thereof. From the shell and tube assembly, the heated fuel passes into second chamber 24 through first fluid opening 32.

The warmed fuel in the second chamber passes through the thermostatic actuator between the core 94 and the housing 92. After passing the thermostatic actuator, the fuel leaves the device through the fuel outlet 14. The fuel will continue to travel only through the first heat exchanger portion of the device and be heated as long as the fuel passing out of the device is below the desired fuel temperature range for the engine fuel control system.

When the fuel warms to an extent that maximum heating is no longer desirable, the material inside the core 94 of the thermostatic actuator expands. The thermostatic actuator 86 moves plunger rod 88 to the left of the position shown in FIG. 1, against the biasing force of spring 84. Movement of the plunger rod correspondingly moves movable member 74, and back disc 78 of the movable member is moved away from seat 82. Simultaneously the cylindrical wall portion 76 of the movable member uncovers second opening 30 in the first chamber. As a result, fuel begins to flow through orifices 80, and passes through second opening 30 into second heat exchanger portion 20 where it is cooled. The fuel passing through the second heat exchanger portion is delivered to second chamber 24 through second fluid opening 34. In the second chamber the cooled fuel from the second heat exchanger portion mixes with the heated fuel that has been delivered to the second chamber through the first fluid opening 32. The mixed fuel then flows past the thermostatic actuator and out the outlet of the device.

It should be noted that as movable member 74 moves to the left of the position shown in FIG. 1 to open second opening 30, cylindrical wall portion 76 correspondingly moves to block first opening 28. Thus, the positioning of the movable member meters the amounts of fluid being heated and cooled in response to the thermostatic actuator.

Should the fuel reach a temperature that is beyond the acceptable operating range, actuator 86 extends plunger rod 88 to a fully extended second position. In this second position, movable member 74 blocks first opening 28 while second opening 30 is fully opened. As a result, all of the fuel passing through the device is cooled in the second heat exchanger portion. This results in maximum cooling.

When the fuel again comes within the acceptable operating range, the material in core 94 of actuator 86 enables plunger rod 88 to retract and move to the right as shown in FIG. 1. The force applied by spring 84 helps to move the plunger rod back into the core. Again, the fuel flow between the first and second heat exchanger portions will be divided in a manner that maintains the fuel temperature at the outlet of the device within the desired operating range for the engine.

In other embodiments of the invention, the heater and cooler may be combined in a single housing with a fuel filter and/or water separator. In such embodiments, the fuel after it has passed through the heat exchanger portions, may be conducted through a filter or separator apparatus before it is passed through the thermostatic actuator to the outlet.

Adjusting the fuel to within the desired temperature range insures that it will readily flow through filter or separator media. The thermostatic actuator positioned adjacent the outlet of the device also compensates for heat that is lost or absorbed by the fuel as it flows through the filtration or separation apparatus. Such construction also lowers the probability that contaminants will clog the passageways through the actuator, as the actuator is exposed only to fuel that has undergone filtration or separation. In other embodiments of the invention, the heater and cooler may be combined in series in a single housing with filtration and/or separation apparatus.

Thus, the new thermostatically controlled fuel heater and cooler achieves the above stated objectives, eliminates difficulties encountered in the use of prior devices, solves problems and obtains the desirable results described herein.

In the foregoing description, certain items have been used for brevity, clarity and understanding; however no unnecessary limitations are to be implied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated and the advantages and useful results obtained; the new and useful structures, devices, elements, arrangements, parts, calculations, systems, equipment, operations and relationships are set forth in the appended Claims.

I claim:

1. A device for controlling the temperature of fuel delivered to an engine comprising:
    a body, the body including an inlet and an outlet, the body further including a first heat exchanger portion in operative connection with a heat source, and a second heat exchanger portion in operative connection with a heat sink;

said body further including first fluid passage means for conducting fuel through said first heat exchanger portion and second fluid passage means for conducting fuel through said second heat exchanger portion;

temperature sensing means in said body adjacent said outlet for sensing the temperature of the fuel; and valve means responsive to said temperature sensing means for directing fuel to said first and second fluid passage means.

2. The device according to claim 1 wherein said body further comprises a first chamber, said chamber including a first opening to said first fluid passage means.

3. The device according to claim 2 wherein said valve means includes a movable member responsive to said temperature sensing means, and wherein in a first position said movable member enables fuel to enter said first opening, and in a second position said movable member prevents fuel from entering said first opening.

4. The device according the claim 3 wherein said first chamber includes a second opening to said second fluid passage means, and wherein in the second position said movable member enables fuel to enter said second opening, and in the first position prevents fuel from entering said second opening.

5. The device according to claim 4 wherein said first chamber is a cylindrical chamber and said movable member is a cylindrical member, said cylindrical member movable longitudinally in said first chamber.

6. The device according to claim 5 wherein said body includes a seat, and said movable member includes at least one orifice therethrough, said seat in blocking relation of said orifice when the cylindrical member is in the first position.

7. The device according to claim 6 wherein said body further comprises a second chamber, said second chamber including means for accepting fluid delivered from said first and second fluid passage means.

8. The device according to claim 7 wherein said temperature sensing means includes a thermostatic actuator mounted in the second chamber.

9. The device according to claim 8 wherein the thermostatic actuator includes a plunger rod, said plunger rod extensible responsive to increasing temperature to move said cylindrical member between said first and second positions.

10. The device according to claim 9 wherein said thermostatic actuator includes a temperature expansible material for extending said plunger rod responsive to increased temperature.

11. The device according to claim 10 wherein said apparatus further includes biasing means for biasing said plunger rod toward a retracted position.

12. The device according to claim 11 wherein said biasing means is a compression spring in abutting contact with said cylindrical member, said compression spring biasing said member toward the first position.

13. The device according to claim 12 wherein said inlet, outlet, movable member and plunger rod are coaxial.

14. The device according to claim 13 wherein said body includes a middle portion, and said first and second heat exchanger portions are attached to said middle portion.

15. The device according to claim 14 wherein said first heat exchanger portion includes a first shell and tube assembly; said first shell and tube assembly including a first tube portion, said first fluid passage means including the tube portion of said first assembly.

16. The device according to claim 15 wherein said first heat exchanger portion includes a first end cap, said first end cap including a first central threaded portion, said first central threaded portion accepted by said middle portion of said body; said first central portion including a first fluid conduit for accepting fluid from said first opening.

17. The device according to claim 16 wherein said first end cap further includes at least one first port; said first conduit and said first tube portion in fluid communication through said first port.

18. The device according to claim 17 wherein said first end cap further comprises a first flange portion, said first shell and tube assembly positioned between said first flange portion and the middle portion of said body.

19. The device according to claim 18 wherein said first shell and tube assembly includes a first shell portion and wherein said first shell portion is supplied with a hot fluid from said engine.

20. The device according to claim 19 wherein said hot fluid is hot engine coolant.

21. The device according to claim 20 wherein said second heat exchanger portion includes a second shell and tube assembly; said second shell and tube assembly including a second tube portion, said second fluid passage means including said second tube portion of said second assembly.

22. The device according to claim 21 wherein said second heat exchanger portion includes a second end cap, said second end cap including a second central threaded portion, said second central threaded portion accepted by said middle portion of said body; said second central portion including a second fluid conduit for accepting fluid from said second opening in said first chamber.

23. The device according to claim 22 wherein said second end cap further includes at least one second port, said second conduit and said second tube portion in fluid communication through said second port.

24. The device according to claim 23 wherein said second end cap further comprises a second flange portion, said second shell and tube assembly positioned between said second flange portion and said middle portion of said body.

25. The device according to claim 24 wherein said second shell and tube assembly includes a second shell portion, and wherein said second shell portion is supplied with a heat accepting fluid.

26. The device according to claim 25 wherein said heat accepting fluid is a refrigerant material.

* * * * *